US005589302A

United States Patent [19]

Degen et al.

[11] Patent Number: 5,589,302
[45] Date of Patent: Dec. 31, 1996

[54] BATTERY SEPARATOR AND BATTERY CONTAINING SAME

[75] Inventors: Peter J. Degen, Huntington; Joseph Y. Lee, South Setauket, both of N.Y.

[73] Assignee: Pall Corporation, East Hills, N.Y.

[21] Appl. No.: 334,756

[22] Filed: Nov. 4, 1994

[51] Int. Cl.$^6$ .................................................. H01M 2/16
[52] U.S. Cl. ........................ 429/250; 429/249; 429/142; 429/144
[58] Field of Search .................................. 429/129, 142, 429/144, 249, 250

[56] References Cited

U.S. PATENT DOCUMENTS

| | | | |
|---|---|---|---|
| 3,121,658 | 2/1964 | Orsino et al. | 429/250 |
| 3,427,206 | 2/1969 | Scardaville et al. | 429/144 |
| 3,600,122 | 8/1971 | Coleman . | |
| 4,110,143 | 8/1978 | Cogliano et al. | 156/167 |
| 4,253,927 | 3/1981 | Bernstein et al. . | |
| 4,298,668 | 11/1981 | Schmidt et al. | 429/250 |
| 5,100,723 | 3/1992 | Iwasaki et al. | 429/249 |
| 5,284,704 | 2/1994 | Kochesky et al. | 429/249 |
| 5,354,617 | 10/1994 | Ikkanzaka et al. | 429/250 |
| 5,401,594 | 3/1995 | Schwobel et al. | 429/144 |
| 5,492,781 | 2/1996 | Degen et al. | 429/144 |

FOREIGN PATENT DOCUMENTS

| | | |
|---|---|---|
| 0316916 | 5/1989 | European Pat. Off. . |
| 0325102 | 7/1989 | European Pat. Off. . |
| 0450449 | 10/1991 | European Pat. Off. . |

OTHER PUBLICATIONS

Billmeyer, "Textbook of Polymer Science", Wiley–Interscience, pp. 222 and 224, month unavailable 1971.
Patent Abstracts of Japan, 4 (133), E–026 (Sep. 18, 1980) (JP–A–55–088263).
Patent Abstracts of Japan, 4 (145), E–029 (Oct. 14, 1980) (JP–A–55–096554).
Patent Abstracts of Japan, 6 (243), E–145 (Dec. 2, 1982) (JP–A–57–141862).
Patent Abstracts of Japan 7 (166), E–188 (Jul. 21, 1958) (JP–A–58–073954).
Patent Abstracts of Japan 13 (450), E–830 (Oct. 11, 1989) (JP–A–01–175165).
Hirose Brochure, "HOP Fibers" (Hirose Corporation, Japan) (no date given).
Ishida et al., "Separators for Alakaline Batteries," Chemical Abstract 121:113378q (no date given).
Ishida et al., "Separators for Cylindrical Batteries," Chemical Abstract 121:113379r (no date given).

Primary Examiner—Stephen Kalafut
Assistant Examiner—Carol Chaney
Attorney, Agent, or Firm—Leydig, Voit & Mayer, Ltd.

[57] ABSTRACT

The present invention provides a battery separator comprising (a) a nonwoven web of fibers having a mean diameter of about 15 μm or less and (b) a graft polymerized monomer on the surface of the nonwoven web which renders the nonwoven web spontaneously wettable by an alkaline electrolyte, wherein the nonwoven web comprises at least about 60 wt. % of a first polyolefin having a first melting temperature and no more than about 40 wt. % of a second polyolefin having a second melting temperature which is lower than the first melting temperature, the nonwoven web has been subjected to a temperature between the first and second melting temperatures, and the nonwoven web has a thickness of at least about 50 μm. The present invention also provides a battery containing such a battery separator, as well as a method of preparing such a battery separator and battery.

32 Claims, No Drawings

BATTERY SEPARATOR AND BATTERY CONTAINING SAME

TECHNICAL FIELD OF THE INVENTION

The present invention pertains to a battery separator and associated method of production, as well as to a starved-electrolyte battery containing the battery separator. In particular, the present invention is directed towards a battery separator which is capable of being readily wetted by electrolyte and which has high tensile strength characteristics even when wetted by electrolyte.

BACKGROUND OF THE INVENTION

A wide variety of products, from consumer electronics to battery-powered electric vehicles, utilize electrochemical energy sources. Similarly, there are a great number of primary and secondary batteries that have been devised or proposed for these varying applications. For example, the following electrochemical systems are known: AgO/Zn, Ag$_2$O/Zn, HgO/Zn, HgO/Cd, Ni/Zn, Ni/Cd, Ni/MH, and Zn/air.

A battery is a device that is capable of converting electrochemical energy into direct current and can be designated as either a primary or a secondary battery. The difference between primary batteries and secondary batteries is in the type of electrochemically active material that is employed. Primary batteries and fuel cells are defined as those battery systems that create electric current through the oxidation of fossil fuels and electrochemical derivatives. *Kirk-Othmer Encyclopedia of Chemical Technolgly,* 3, 545 et seq. (1978). As such, when the fuel or the electrochemically active material is completely consumed, the life of the battery is completely exhausted. Secondary cells, on the other hand, generate electrical current through reversible chemical reactions, and thus can be recharged by applying an external current through the battery in a direction opposite to normal current flow. Id. at 569.

Batteries are made up of one or more battery cells. In its most elementary form, a battery cell comprises a pair of plates, namely, an anode and a cathode, a battery separator, and an electrolyte. When a load is applied to the battery, electrons are generated through oxidation at the anode. The electrons thus generated pass through the load, then return to the battery cell at the cathode, where the cathode is reduced.

In such battery cells, the electrolytic solution, i.e., the solution containing the electrolyte, is the medium for mass transport between the plates. The primary functions of the battery separator are to prevent physical contact between the plates and to retain the electrolytic solution. In a starved-electrolyte battery cell, the separator completely occupies the space between the plates, and the electrolytic solution is completely contained within the battery separator. The battery separator thus functions as the reservoir for the electrolytic solution in such cells.

Battery separators for such electrochemical systems desirably possess a variety of characteristics. For example, the battery separator should be spontaneously, uniformly, and permanently wettable in order to accommodate and fully retain the electrolytic solution, which is typically aqueous. The spontaneous wettability of the battery separator ensures that the absorption of the electrolytic solution by the battery separator during battery manufacture will not result in the existence of spots which are devoid of electrolyte, e.g., gas bubbles or air pockets, or otherwise result in a high resistance spot, within the battery separator, which would adversely affect performance. The uniform wettability of the battery separator ensures that the battery separators will have consistent properties and that, therefore, batteries manufactured using such separators will perform consistently and predictably. The permanent wettability of the battery separator ensures that, over the service life of a battery, the battery separator will not develop spots which are devoid of electrolyte, e.g., gas bubbles or air pocket, or other high resistance spots with nonuniform current distribution, within in the battery separator, which would alter and adversely affect performance.

The battery separator further should be dimensionally stable, and preferably does not swell or shrink significantly upon introduction of the electrolytic solution. Of course, the battery separator also should be chemically inert to the harsh electrolyte conditions commonly found within battery cells and, moreover, should remain useful for as many as ten years of battery service at temperatures ranging from $-40°$ C. to $+70°$ C. In addition, the battery separator should have a high mechanical strength, particularly when wetted with an electrolyte. This will allow the battery separator to be incorporated into a battery using conventional manufacturing processes.

Another desired feature of such a battery separator is that it presents a minimal electrolytic resistance, preferably a resistance less than about 350 m$\Omega$–cm$^2$, e.g., about 100–350 m$\Omega$–cm$^2$, or even as low as 60 m$\Omega$–cm$^2$ or less, measured in 30% KOH at 1000 Hz at 23° C. or as determined by the requirements of a given battery cell. Minimal electrolytic resistance is important for a number of reasons. For example, if the electrolytic resistance is too great, the power output of the battery is lessened correspondingly.

The electrolytic resistance of a battery separator is a direct function of the ability of the electrolyte to pass through the separator. In addition, this resistance depends on the amount of electrolyte contained within the separator. For this reason, the battery separator preferably is designed such that the electrolytic solution is quickly and completely imbibed by the battery separator. In other words, the battery separator should have a high capillarity and be completely wetted. Moreover, for ease of battery manufacture, the battery separator should be able to rapidly wick the electrolytic solution when the solution is introduced to the separator and thereby displace all of the air from the separator such that the separator becomes fully and homogenously wetted with the electrolyte. In addition, it is highly desirable that the battery separator have a high and consistent absorption capacity, i.e., that it is able to absorb a large quantity of electrolytic solution. Preferably, a battery separator should be able to absorb 100–500% of its weight of an electrolytic solution.

A battery separator also preferably has a uniform structure. This entails that both the absolute thickness of the separator and the density of the separator be uniform. If the structure within the battery separator is not uniform, the electrolytic resistance of the battery can become nonuniform, for example, through the formation of spots devoid of electrolytic solution, e.g., gas bubbles or air pockets, within the separator. This can lead to a nonuniform current distribution within the battery separator, and, furthermore, internal shorting between the electrodes can take place leading to battery discharge and failure. In addition, if the electrolyte concentration within the battery separator should grow less uniform over time, the electrolytic resistance can rise to such a level as to render the battery inoperative.

A further benefit of a uniform separator is that the properties of each separator produced by a given manufacturing process will be consistent and predictable. During the manufacturing process, many battery separators can be cut from a single roll of material. If the physical properties of the lot of material vary, the separators produced from the material can have unpredictable characteristics. For example, the amount of electrolyte imbibed by each separator can vary, causing difficulty with the final battery manufacturing process. Moreover, should a given lot of battery separators have diverse electrolytic resistances, wide fluctuations in the voltages and power outputs of the batteries produced with these separators can result.

Various battery separators have been designed throughout the years in an attempt to achieve one or more of these desirable advantages. Yet, in many cases the design of the battery separators has compromised a number of desirable features. For example, as a result of efforts to render the surface of the battery separators spontaneously wettable, many battery separators are formed with materials that are capable of being leached by the electrolytic solution. These materials can include surface-active compounds or other wetting agents. When these compounds are leached from the battery separator, the structure and spontaneous wettability with electrolyte of the separator is degraded. Moreover, the leached materials contaminate the electrolytic solution and can react with and degrade the electrolytic solution and/or the electrodes, thereby causing loss of power. Each of these effects reduces the useful life of the battery. Similarly, many battery separators contain metallic contaminants, which also can be leached into the electrolytic solution with similar adverse effects. Also, some processes of rendering battery separators spontaneously wettable can adversely affect the tensile properties of the battery separator, thereby rendering them difficult to utilize in the manufacture of batteries.

A particular problem that the prior art has failed to address in a satisfactory manner is the problem of dry spots within the separator. Nonuniformity can cause the electrolytic solution to channel through segments of the battery separator, thereby resulting in the formation of dry spots. These dry spots reduce the effective area through which the electrolytic solution can travel, thereby increasing the electrolytic resistance of the battery separator. Nonuniformity can, in addition, cause innumerable manufacturing problems when attempting to produce batteries having consistent properties. Similarly, the insufficient tensile properties of a separator to withstand mechanical handling requirements during battery manufacture can increase battery manufacturing difficulties.

Accordingly, the present invention seeks to attain the features desired of a battery separator with minimal compromise. Thus, the present invention is directed toward producing a battery separator that is readily compatible with an electrolytic solution, and that has, for example, high capillarity, dimensional stability upon wetting, high absorption capacity, and good resistance to leaching and other chemical attack, while possessing good tensile properties and a low resistance to the passage of electrolyte. Complete batteries and methods of manufacturing battery separators and batteries also fall within the purview of the present invention. These and other advantages and benefits of the present invention will be apparent from the description of the present invention set forth herein.

BRIEF SUMMARY OF THE INVENTION

The present invention provides a battery separator comprising (a) a nonwoven web of fibers having a mean diameter of about 15 µm or less and (b) a graft polymerized monomer on the surface of the nonwoven web which renders the nonwoven web spontaneously wettable by an alkaline electrolyte, wherein the nonwoven web comprises at least about 60 wt. % of a first polyolefin having a first melting temperature and no more than about 40 wt. % of a second polyolefin having a second melting temperature which is lower than the first melting temperature, the nonwoven web has been subjected to a temperature between the first and second melting temperatures, and the nonwoven web has a thickness of at least about 50 µm. The present invention also provides a battery containing such a battery separator, as well as a method of preparing such a battery separator and battery.

DESCRIPTION OF THE PREFERRED EMBODIMENTS

The battery separator of the present invention comprises battery separator comprising (a) a nonwoven web of fibers having a mean diameter of about 15 µm or less and (b) a graft polymerized monomer on the surface of the nonwoven web which renders the nonwoven web spontaneously wettable by an alkaline electrolyte. The nonwoven web comprises at least about 60 wt. % of a first polyolefin having a first melting temperature and no more than about 40 wt. % of a second polyolefin having a second melting temperature which is lower than the first melting temperature. The nonwoven web has been also subjected to a temperature between the first and second melting temperatures and has a thickness of at least about 50 µm.

While the nonwoven web comprises at least about 60 wt. % of a first polyolefin having a first melting temperature and no more than about 40 wt. % of a second polyolefin having a second melting temperature which is lower than the first melting temperature, the nonwoven web preferably comprises at least about 70 wt. %, more preferably at least about 80 wt. % (e.g., about 80–90 wt. %), of the first polyolefin and no more than about 30 wt. %, more preferably no more than about 20 wt. % (e.g., about 10–20 wt. %), of the second polyolefin. The fibers preferably comprise a core of the first polyolefin and at least a partially surrounding surface coating of the second polyolefin. More preferably, the fibers comprise a core of the first polyolefin and a sheath of the second polyolefin (i.e., the second polyolefin forms a continuous coating over the surface of the core of the first polyolefin).

The nonwoven web can be prepared from any suitable polyolefins. Suitable polyolefins include polyethylene, polypropylene, and polymethylpentene. The first polyolefin is preferably polypropylene, with the second polyolefin preferably being polyethylene. The fibers of the nonwoven web can be prepared by any suitable means and formed into a nonwoven web by any suitable means, such as the conventional Fourdrinier paper making processes.

The nonwoven web is subjected to a temperature between the first and second melting temperatures of the first and second polyolefins. The nonwoven web can be calendared during or after such a heat-setting process and is preferably calendared during the heat-setting process, e.g., by passing the nonwoven web through calendar rolls which are heated. Calendaring also can be useful to reduce the thickness of the nonwoven web and to improve its thickness uniformity. Calendaring, however, can adversely affect the strength characteristics of the nonwoven web, and, thus, care should be exercised in calendaring the nonwoven web so as not to adversely the affect its strength to such an extent that the nonwoven web will not provide sufficient strength for use a battery separator. In addition, the nonwoven web should not be calendared so as to render the nonwoven web nonporous, or so as to adversely affect the absorption and fluid flow properties across the nonwoven web to a significant extent.

The fibers used to form the nonwoven web have a mean diameter of about 15 μm or less. Preferably, substantially all of the fibers forming the nonwoven web have a diameter of about 15 μm or less. The fibers forming the nonwoven web will be typically about 8–12 μm in diameter.

The nonwoven web can have any suitable basis (or sheet) weight. The nonwoven web preferably has a basis weight of at least about 10 g/m², more preferably greater than about 20 g/m². The nonwoven web will typically have a sheet weight of about 10–120 g/m².

The battery separator of the present invention can have any suitable tensile properties. Preferably, the present inventive battery separator will have a dry tensile strength and a wet (H$_2$O) tensile strength in the machine direction of at least about 10 lb/linear in (about 175 kg/m) and a dry tensile strength and a wet (H$_2$O) tensile strength in the cross-machine direction of at least about 8 lb/linear in (about 140 kg/m). More preferably, the present inventive battery separator will have a wet (H$_2$O) tensile strength in the machine direction of at least about 15 lb/linear in (about 265 kg/m) and a wet (H$_2$O) tensile strength in the cross-machine direction of at least about 10 lb/linear in (about 175 kg/m). The present inventive battery separator typically will have a dry elongation of at least about 20% and a wet (H$_2$O) elongation of at least about 40% in both the machine and cross-machine directions.

All of the tensile properties discussed herein are as measured using an Instron® table model tester in the following manner which is similar to ASTM D-1117. The sample size is 1 in wide×3 in long (2.54 cm wide×7.62 cm long). The grip separation is 1 in (2.54 cm). The strain rate is 1 in/min (2.54 cm/min). The testing temperature is 23° C. Tensile strength is calculated as follows: TS=F/W, where TS is tensile strength, F is the load at break, and W is the width of the sample. Percent elongation is calculated as follows: % E=[(L−L$_0$)/L$_0$]×100, where % E is percent elongation, and L and L$_0$ are the elongation at break and initial distance between the grip, respectively. Ten samples are utilized in each direction (i.e., the machine and cross-machine directions), and the reported results are averages of those ten samples.

The nonwoven web can be of any suitable thickness and generally will be at least about 50 μm. The nonwoven web is preferably as thin as possible, e.g., sufficient to provide the desired strength and uniformity to the battery separator. Further, the separator should be of sufficient thickness to provide the needed physical and electrical separation between battery electrodes and the desired electrolyte capacity. The separator preferably has a thickness of less than about 500 μm, more preferably less than about 250 μm, and most preferably about 50 to about 200 μm.

All of the thickness measurements discussed herein are as measured using a Federal Maxum® thickness gauge (0.0001 in [2.54 μm]) with a contact point area of 0.0276 in² (0.178 cm²) and a total dead weight on the contact point of 0.25 lb (0.11 kg), resulting in a media pressure of 9.06 psi (62.5 kPa). A 10 ft long×9.5–10.5 in wide (305 cm long×24–27 cm wide) sample is utilized for the thickness measurements. The base line of the thickness gauge is adjusted to zero prior to the measurement of each sample. The handle of the gauge is depressed; the weight is raised, and then the sample is inserted into the gauge, while attempting to maintain the sample as flat as possible throughout the measurement. The gauge handle is released, and the weight is applied against the sample. When the gauge reading stabilizes, that value is utilized as the thickness value. Five such readings are made across the width of the sample, with such five readings being made at about 0.5 ft (15 cm) spaced intervals along the length of the sample. The resulting 100 readings are averaged and utilized as the thickness of the sample.

The nonwoven web should be as uniform as possible as regards thickness. Preferably, the nonwoven web will have a thickness variability of no more than about ±10%, more preferably no more than about ±9%, which represents about 3 standard deviations of the mean thickness of the nonwoven web. Most preferably, the nonwoven web will have a thickness variability of no more than about ±5%.

The nonwoven web can be graft polymerized with any suitable monomer in any suitable manner to render the nonwoven web spontaneously wettable by an alkaline electrolyte, e.g., 20–40% KOH. Preferably, the nonwoven web will be modified to have a critical wetting surface tension (CWST) of at least about 70 dynes/cm as determined by the CWST test disclosed in U.S. Pat. No. 4,880,548. More preferably, the nonwoven web has a critical wetting surface tension of at least about 79 dynes/cm, and, most preferably, the nonwoven web is characterized by a drop of a fluid having a critical wetting surface tension of about 83 dynes/cm contacting the surface of said nonwoven web being absorbed into said nonwoven web in less than about 10 sec.

The monomer preferably is selected from the group consisting of vinyl sulfonic acid, vinyl phosphonic acid, and acrylic and methacrylic acid monomers and hydroxyl functional derivatives thereof. More preferably, the monomer is selected from the group consisting of acrylic acid, methacrylic acid, hydroxyethylacrylate, hydroxyethylmethacrylate, hydroxypropylacrylate, hydroxypropylmethacrylate, and combinations thereof, particularly methacrylic acid and hydroxyethylmethacrylate.

While any suitable means can be used to graft polymerize the monomer onto the hydrophobic fibers employed in the present invention, radiation grafting is the preferred technique to achieve the desired result. The source of the radiation can be from radioactive isotopes such as cobalt 60, strontium 90, or cesium 137. Alternatively, the radiation may come from such sources such as X-ray machines, electron accelerators, ultraviolet generators, and the like. Electron beam (E-beam) radiation is the preferred source of radiation in that it yields a uniformly grafted product.

Grafting will typically be accomplished by either irradiating the nonwoven web and then exposing it to a suitable solution of monomer, or, alternatively, by irradiating the nonwoven web while it is contacted with a solution of the monomer. If the polymerization is effected by the former method, the nonwoven web should contact the monomer solution as quickly as possible in order to minimize any side-reactions that will deplete the active sites generated by the radiation. In either case, the radiation should be conducted in the absence of oxygen, which reduces the effectiveness of the process. Preferably, irradiation is performed under inerting by nitrogen or other noble gas(es).

After completion, the battery separator should be readily and uniformly wettable in a consistent manner, which allows for the efficient and complete introduction of electrolyte during battery manufacture. A practical measure of the wettability of a battery separator is wicking rate of the battery separator, e.g., the relative time for a battery separator to vertically wick an electrolyte a given distance. The present inventive battery separator preferably is able to vertically wick 30% KOH to a distance of 1 inch (2.54 cm) in less than about 300 seconds, more preferably less than about 200 seconds, and most preferably less than about 150 seconds. An alternate test method involves the measurement of the vertical distance climbed during a fixed time interval, e.g., 30 seconds or 1 minute.

The present invention also encompasses a method of making a battery separator as described herein. The method comprises (a) preparing a nonwoven web of fibers having a mean diameter of about 15 μm or less, wherein the nonwoven web comprises at least about 60 wt. % of a first polyolefin having a first melting temperature and no more than about 40 wt. % of a second polyolefin having a second melting temperature which is lower than the first melting temperature, and the nonwoven web has a thickness of at least about 50 μm, (b) subjecting the nonwoven web to a temperature between the first and second melting temperatures, and (c) graft polymerizing a monomer on the surface of the nonwoven web which renders said nonwoven web spontaneously wettable by an alkaline electrolyte, e.g., 20–40% KOH. The various aspects of the present inventive method, such as the preferred characteristics of the nonwoven web, preferred monomer for graft polymerization, and the like, have been discussed above with respect to the present inventive battery separator.

The present invention further provides for a novel battery, as well as a method of preparing such a battery. In particular, the present invention provides a battery, particularly a starved-electrolyte battery, wherein the improvement comprises the inclusion of the battery separator of the present invention. Similarly, the present invention provides a method of preparing a battery, particularly a starved-electrolyte battery, wherein the improvement comprises the inclusion within such a battery of the battery separator of the present invention. The battery separator of the present invention can be incorporated into a battery using any suitable manufacturing process. A wide variety of primary and secondary batteries fall within the purview of the present invention, for example, AgO/Zn, Ag$_2$O/Zn, HgO/Zn, HgO/Cd, Ni/Zn, Ni/Cd, Ni/MH, and Zn/air electrochemical systems. These batteries may be made by, for example, arranging a number of battery cells in series, wherein at least one of the cells contains a battery separator of the present invention.

The following examples further illustrate the present invention and, of course, should not be construed as in any way limiting its scope.

EXAMPLE 1

This example provides an illustration of battery separators according to the present invention.

A roll of Hirose® HOP50H nonwoven web was obtained with the properties set forth below for the untreated control. The nonwoven web comprises fibers of a polypropylene core and surrounding polyethylene sheath such that the fibers are about 80 wt. % polypropylene and about 20 wt. % polyethylene. As obtained, the nonwoven web had already been subjected to a temperature between the melting temperatures of polypropylene and polyethylene, namely 140° C.

The nonwoven web was divided into four samples. Two of the samples were E-beam grafted utilizing a monomer solution of 6 vol. % hydroxyethylmethacrylate (HEMA), 10 vol. % methacrylic acid (MA), 0.05 vol. % diethyleneglycol dimethacrylate (DEGDMA), 25 vol. % t-butyl alcohol (TBA), and 58.95 vol. % water, with one of the two samples receiving a radiation dose of about 1.5 Mrad and the other of the two samples receiving a radiation dose of about 2 Mrad. The other two samples were E-beam grafted utilizing a monomer solution of 4 vol. % HEMA, 12 vol. % MA, 0.05 vol. % DEGDMA, 25 vol. % TBA, and 58.95 vol. % water, with one of the two samples receiving a radiation dose of about 1.5 Mrad and the other of the two samples receiving a radiation dose of about 2 Mrad. The samples were then washed with deionized water and dried in an air-circulating oven. The properties of these samples are set forth below in Table 1.

TABLE 1

|  | Untreated Control | Sample A | Sample B | Sample C | Sample D |
| --- | --- | --- | --- | --- | --- |
| Grafting Sln.* | — | 1 | 1 | 2 | 2 |
| Dose (Mrad) | 0 | 1.5 | 2 | 1.5 | 2 |
| Thickness (μm) | 201 ± 9.7 | 253 ± 7.6 | 282 ± 18 | 246 ± 7.6 | 238 ± 8.4 |
| Basis Weight (g/m$^2$) | 46 | 83 | 95 | 86 | 82 |
| Gurley Air Flow - 4 layers @ 100 ml (sec) | 0.18 ± 0.02 | 0.21 ± 0.016 | 0.245 ± 0.019 | 0.20 ± 0.013 | 0.22 ± 0.009 |
| Wicking Rate (sec/cm) | >4,000 | 52 | 48 | 39 | 59 |
| % Absorption of 30% KOH | 6 | 406 | 400 | 367 | 363 |
| Resistance in 30% KOH (mΩ-cm$^2$) | >20,000 | 78 | 108 | 77 | 79 |

*Grafting Solution #1: 6 vol. % HEMA/10 vol. % MA/0.05 vol. % DEGDMA/25 vol. % TBA/58.95 vol. % water
Grafting Solution #2: 4 vol. % HEMA/12 vol. % MA/0.05 vol. % DEGDMA/25 vol. % TBA/58.95 vol. % water As is apparent from the test results set forth in Table 1, the present inventive battery separators exhibit good wicking, absorption, and resistance properties. Moreover, these desirable characteristics are achieved without significant adverse effects with respect to air flow and tensile properties as compared to the untreated control.

EXAMPLE 2

This example illustrates the good wettability properties of the battery separators of the present invention.

Each of the four grafted samples, as well as the untreated control, from Example 1 were evaluated for wettability. In particular, ten drops of a test fluid having a certain critical wetting surface tension were placed in an evenly spaced manner on a 1 ft×1 ft (30 cm×30 cm) area of the untreated control and each of the grafted samples. The time for the fluid drops to be absorbed by the untreated control and each of the grafted samples was then observed. This test was then repeated for three other fluids having different critical wetting surface tensions on new 1 ft×1 ft (30 cm×30 cm) areas of the untreated control and each of the grafted samples. The results of this evaluation are set forth below in Table 2.

TABLE 2

| Fluid CWST | Untreated Control | Sample A | Sample B | Sample C | Sample D |
|---|---|---|---|---|---|
| 72 dynes/cm [72 mN/m] | not wetted | instant | instant | instant | instant |
| 79 dynes/cm [79 mN/m] | not wetted | instant | instant | instant | instant |
| 83 dynes/cm [83 mN/m] | not wetted | <10 sec | <5 sec | <5 sec | <5 sec |
| 87 dynes/cm [87 mN/m] | not wetted | 60 sec | 45 sec | 60 sec | 45 sec |

The test results set forth in Table 2 demonstrate the good wettability of the present inventive battery separators. The ability of the battery separators of the present invention to readily absorb fluids of high critical wetting surface tensions further demonstrates the excellent suitability of the separators in the manufacture of batteries.

EXAMPLE 3

This example illustrates the good tensile properties of the battery separators of the present invention, particularly when wet, as compared to the untreated control.

The untreated control and four grafted samples of Example 1 were evaluated as to their respective tensile properties. In particular, the tensile strength and elongation values in the machine direction (MD) and cross-machine direction (CD) were determined for each of the examples in the dry condition and as saturated with water. The results of these tests, which were conducted in duplicate, are set forth below in Table 3.

TABLE 3

| Dry Properties | Untreated Control | Sample A | Sample B | Sample C | Sample D |
|---|---|---|---|---|---|
| Tensile Strength - MD (lb/in) [kg/m] | 15.1, 15.5 [270, 277] | 14.9, 14.9 [266, 266] | 15.7, 13.6 [280, 243] | 16.1, 16.1 [288, 288] | 15.6, 16.2 [279, 289] |
| % Elongation - MD | 52, 48 | 30, 33 | 32, 28 | 33, 35 | 28, 32 |
| Tensile Strength - CD (lb/in) [kg/m] | 10.6, 9.8 [189, 175] | 12.5, 11.7 [223, 209] | 10.4, 11.1 [186, 198] | 11.8, 11.5 [211, 205] | 10.9, 11.4 [195, 204] |
| % Elongation - CD | 53, 58 | 33, 32 | 27, 25 | 35, 37 | 30, 35 |
| Wet Properties | | | | | |
| Tensile Strength - MD (lb/in) [kg/m] | 15.0, 16.8 [268, 300] | 18.2, 18.3 [325, 327] | 17.4, 17.2 [311, 307] | 17.3, 19.3 [309, 345] | 19.7, 17.8 [352, 318] |
| % Elongation - MD | 58, 55 | 53, 53 | 50, 50 | 52, 55 | 53, 48 |
| Tensile Strength - CD (lb/in) [kg/m] | 11.3, 11.8 [202, 211] | 13.1, 14.6 [234, 261] | 12.0, 10.6 [214, 189] | 13.2, 13.5 [236, 241] | 13.3, 12.1 [238, 216] |
| % Elongation - CD | 58, 57 | 50, 55 | 50, 47 | 57, 53 | 50, 47 |

The tensile property results set forth in Table 3 demonstrate that there is no significant decrease in the dry tensile strength attendant the E-beam grafting of the nonwoven web to prepare the present inventive battery separators. Moreover, the wet tensile strength properties of the present inventive battery separator are at least about the same as, and are generally improved over, the dry tensile strength properties of the same battery separators and the dry and wet tensile strength properties of the precursor ungrafted nonwoven web. Furthermore, the wet elongation properties of the present inventive battery separators are nearly the same as the dry and wet elongation properties of the ungrafted nonwoven web.

All of the references cited herein, including publications, patents, and patent applications, are hereby incorporated in their entireties by reference.

While this invention has been described with an emphasis upon preferred embodiments, it will be apparent to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A battery separator comprising (a) a nonwoven web of fibers having a mean diameter of about 15 μm or less and (b) a graft polymerized monomer on the surface of said nonwoven web which renders said nonwoven web spontaneously wettable by an alkaline electrolyte, wherein said nonwoven web comprises at least about 60 wt. % of a first polyolefin having a first melting temperature and no more than about 40 wt. % of a second polyolefin having a second melting temperature which is lower than said first melting temperature, said nonwoven web has been subjected to a temperature between said first and second melting temperatures, said nonwoven web has a thickness of at least about 50 μm, and said monomer is selected from the group consisting of vinyl sulfonic acid, vinyl phosphonic acid, and acrylic and methacrylic acid monomers and hydroxyl functional derivatives thereof.

2. The battery separator of claim 1, wherein said nonwoven web has a critical wetting surface tension of at least about 79 dynes/cm.

3. The battery separator of claim 2, wherein said nonwoven web is characterized by a drop of a fluid having a critical wetting surface tension of about 83 dynes/cm contacting the surface of said nonwoven web being absorbed into said nonwoven web in less than about 10 sec.

4. The battery separator of claim 3, wherein said nonwoven web has a thickness of about 500 μm or less.

5. The battery separator of claim 4, wherein said nonwoven web has a thickness variability of no more than about ±10%.

6. The battery separator of claim 5, wherein said nonwoven web has a basis weight of about 10 g/m² to about 120 g/m².

7. The battery separator of claim 6, wherein said monomer is selected from the group consisting of acrylic and methacrylic acid monomers and hydroxyl functional derivatives thereof.

8. The battery separator of claim 7, wherein said monomer is selected from the group consisting of acrylic acid, methacrylic acid, hydroxyethylacrylate, hydroxyethylmethacrylate, hydroxypropylacrylate, hydroxypropylmethacrylate, and combinations thereof.

9. The battery separator of claim 8, wherein said battery separator has a dry tensile strength and a wet (H₂O) tensile strength in the machine direction of at least about 10 lb/linear in.

10. The battery separator of claim 9, wherein said battery separator has a wet (H₂O) tensile strength in the machine direction of at least about 15 lb/linear in.

11. The battery separator of claim 9, wherein said battery separator has a dry tensile strength and a wet (H₂O) tensile strength in the cross-machine direction of at least about 8 lb/linear in.

12. The battery separator of claim 11, wherein said battery separator has a wet (H₂O) tensile strength in the cross-machine direction of at least about 10 lb/linear in.

13. The battery separator of claim 1, wherein said nonwoven web comprises at least about 80 wt. % of said first polyolefin and no more than about 20 wt. % of said second polyolefin.

14. The battery separator of claim 1, wherein said fibers comprise a core of said first polyolefin and at least a partially surrounding surface coating of said second polyolefin.

15. The battery separator of claim 14, wherein said fibers comprise a core of said first polyolefin and a sheath of said second polyolefin.

16. The battery separator of claims 15, wherein said first polyolefin is polypropylene and said second polyolefin is polyethylene.

17. A starved-electrolyte battery, wherein the improvement comprises the inclusion of the battery separator comprising (a) a nonwoven web of fibers having a mean diameter of about 15 μm or less and (b) a graft polymerized monomer on the surface of said nonwoven web which renders said nonwoven web spontaneously wettable by an alkaline electrolyte, wherein said nonwoven web comprises at least about 60 wt. % of a first polyolefin having a first melting temperature and no more than about 40 wt. % of a second polyolefin having a second melting temperature which is lower than said first melting temperature, said nonwoven web has been subjected to a temperature between said first and second melting temperatures, said nonwoven web has a thickness of at least about 50 μm, and said monomer is selected from the group consisting of vinyl sulfonic acid, vinyl phosphonic acid, and acrylic and methacrylic acid monomers and hydroxyl functional derivatives thereof.

18. The battery of claim 17, wherein said nonwoven web has a critical wetting surface tension of at least about 79 dynes/cm.

19. The battery of claim 18, wherein said nonwoven web is characterized by a drop of a fluid having a critical wetting surface tension of about 83 dynes/cm contacting the surface of said nonwoven web being absorbed into said nonwoven web in less than about 10 sec.

20. The battery of claim 19, wherein said nonwoven web has a thickness of about 500 μm or less.

21. The battery of claim 20, wherein said nonwoven web has a thickness variability of no more than about ±10%.

22. The battery of claim 21, wherein said nonwoven web has a basis weight of about 10 g/m² to about 120 g/m².

23. The battery of claim 22, wherein said monomer is selected from the group consisting of acrylic and methacrylic acid monomers and hydroxyl functional derivatives thereof.

24. The battery of claim 23, wherein said monomer is selected from the group consisting of acrylic acid, methacrylic acid, hydroxyethylacrylate, hydroxyethylmethacrylate, hydroxypropylacrylate, hydroxypropylmethacrylate, and combinations thereof.

25. The battery of claim 24, wherein said battery separator has a dry tensile strength and a wet (H₂O) tensile strength in the machine direction of at least about 10 lb/linear in.

26. The battery of claim 25, wherein said battery separator has a wet (H₂O) tensile strength in the machine direction of at least about 15 lb/linear in.

27. The battery of claim 25, wherein said battery separator has a dry tensile strength and a wet (H₂O) tensile strength in the cross-machine direction of at least about 8 lb/linear in.

28. The battery of claim 27, wherein said battery separator has a wet (H₂O) tensile strength in the cross-machine direction of at least about 10 lb/linear in.

29. The battery of claim 17, wherein said nonwoven web comprises at least about 80 wt. % of said first polyolefin and no more than about 20 wt. % of said second polyolefin.

30. The battery of claim 17, wherein said fibers comprise a core of said first polyolefin and at least a partially surrounding surface coating of said second polyolefin.

31. The battery of claim 30, wherein said fibers comprise a core of said first polyolefin and a sheath of said second polyolefin.

32. The battery of claims 31, wherein said first polyolefin is polypropylene and said second polyolefin is polyethylene.

\* \* \* \* \*